UNITED STATES PATENT OFFICE 2,198,847

METHOD OF CLEANSING FILTER CLOTHS

Anton Volz, Ludwigshafen-on-the-Rhine, Germany, assignor to Hall Laboratories, Inc., Pittsburgh, Pa., a corporation of Pennsylvania No Drawing. Application February 8, 1938, Serial No. 189,383. In Germany February 19, 1937

3 Claims. (Cl. 87—5)

This invention relates to a method of cleansing filter cloths used to remove undesirable sediment and precipitate from fluids. It provides a method for quickly and efficiently removing the encrustation built up on filter cloths as a result of repeated use.

Filter presses and filter bags are used in many chemical processes to free liquors from undesirable sediment. This invention is particularly applicable to the treatment of filter cloths which have been encrusted with a sediment containing albumin and also insoluble calcium and magnesium compounds. The term "filter cloth" is used in its broad sense to include not only textile materials but also other filtering elements.

In the sugar industry, juice is extracted from sugar cane or beet, lime is added and heat is applied to precipitate the albuminoids present in the liquor. This process separates nearly all the albuminoids and a part of the acids, fat wax, and gums. Phosphoric acid or acid phosphate of lime is often used in this purification, since it forms a voluminous precipitate which carries down much flocculent and some coloring matter. The liquor is allowed to settle and then the clear fluid is decanted from the sediment at the bottom of the tank. The sediment is pumped into filter presses and the filtered juice obtained here is combined with the decanted liquor and subjected to further treatment.

In the manufacture of beet sugar, carbonic acid is commonly added to the extracted juice during purification, precipitating lime as a carbonate and salts of the acids of the juice which are removed in the filter press.

The preparation of beer also involves separation of the liquor from the sediment from the wort by the use of filter bags or filter presses.

Thus the sediment found on the filter cloths may contain albuminoid materials, lime compounds of phosphate or carbonate, as well as complex organic fats and waxes.

It is an object of the present invention to provide a method for cleansing the filter cloths used in the presses or filter bags which are encrusted with the sediment removed from the liquor in any of these or analogous industries.

Although the invention is applicable generally to the cleansing of filter cloths, it will be described herein more particularly as applied to the cleansing of brewery filter cloths to remove from them the encrustation which they collect on being used. In the preparation of beer after cooking, cooling and draining of the wort, the sediment left behind is filtered through a filter bag or pressed through a filter press. This sediment consists of 60–70% albumin and also the phosphates of calcium and magnesium, besides cellulose, hop resin, etc. Heretofore washing these filter cloths was generally carried out by the use of alkaline solutions, for example, solutions of caustic soda followed by treatment in cold to hot hydrochloric acid solution. In spite of this treatment, however, a continually greater amount of encrustation formed during use of the filter, thereby decreasing the efficiency of the filter and causing rapid wear and tear of the high grade and expensive filter cloths.

It has also been proposed to use in the treatment of filter cloths aqueous solutions of phosphoric acid of any hydration stage or aqueous solutions of its alkali or ammonium salts, especially mixtures of alkali metaphosphate, pyrophosphate and polyphosphate, such as sodium tetraphosphate and sodium tripolyphosphate, with alkali orthophosphates. However, such reagents have not proved entirely satisfactory. If a new or a slightly encrusted filter cloth is treated in a warm solution of such phosphates, it is successful in keeping the filter cloth clean for a time. However, it is not effective in removing the encrustation from thickly encrusted filter cloth. These filter cloths, even after undergoing a rather long soaking in such solutions, feel slimy but the deposit is not satisfactorily removed. The treatment does not succeed in satisfactorily loosening the soaked encrustation, either by repeated washings or even by acidification with hydrochloric acid, because on drying the filter cloth again feels stiff.

I have found, however, that after treatment of the cloth in a phosphate bath the encrustation can be easily converted into a loosened form, if it is placed in an aqueous diazotizing solution, which may be either cold or warm. After treatment in the diazotizing solution, the filter cloth may be neutralized, if necessary, and then subjected to repeated rinses, whereby the transformation product of the encrustation is washed away. In this manner, there is obtained again a soft usable filter cloth without the pulp being affected.

This treatment may be employed to cleanse filter cloths other than those which have been used in the preparation of beer and having encrustations of albuminous and alkaline-earth deposits which make the usual processes of cleansing the filter cloths impractical. The following are specific examples of various ways in which the present invention may be carried out, it being understood that these are given by way of example only, and not by way of limiting the invention thereto.

Example 1

The wet filter cloth coming from the press is freed from the adhering sediment first by mechanical treatment and then, either wet or after drying, is soaked at a temperature of about 35–40° C. in a solution containing one gram of sodium tetra-phosphate ($Na_6P_4O_{13}$) and one gram of disodium phosphate per liter. It is then rinsed and put in a warm bath of about 10° C. containing three grams of sodium nitrite and nine cubic centimeters of hydrochloric acid of 20° Baumé per liter. After treating in this bath for about one-half hour, it is removed and rinsed further with fresh water. This produces a soft usable filter cloth from which the encrustation has been substantially completely removed.

Example 2

The filter cloth coming from the press is soaked at a temperature of about 40° C. in an aqueous solution containing two grams of sodium metaphosphate and one gram of sodium carbonate per liter. It is then rinsed and treated in a diazotizing solution, as given in Example 1.

Example 3

The filter cloth is first treated with an aqueous solution containing one gram of ammonium and one gram of tetrasodium pyrophosphate per liter and is then put into a diazotizing solution bath, as in Example 1.

Example 4

The filter cloth coming from the filter press is rinsed in luke warm water and soaked in a warm solution (40° C.) containing one gram of sodium pyrophosphoric acid and one gram of sodium hexametaphosphate per liter. It is then rinsed and treated as indicated in Example 1, with a diazotizing solution.

The phosphate bath which precedes the diazotizing bath may contain phosphoric acid in any hydration stage, or it may contain the alkali or ammonium salts of phosphoric acid. The term "phosphate solution" as used in the claims is intended to cover broadly any solution of a phosphate, whether that be orthophosphate, metaphosphate, pyrophosphate, polyphosphate or mixtures of any of them. It also is intended to include the corresponding phosphoric acid or mixtures of the corresponding phosphoric acids.

The term "molecularly dehydrated phosphates" is intended to include the metaphosphates, pyrophosphates and polyphosphates, or the corresponding phosphoric acids, since they may be considered as derived from orthophosphoric acid or the salts thereof by dehydration which effects an atomic rearrangement within the phosphate molecule.

Although I have given certain examples of the manner in which the invention may be practiced, it is to be understood that the invention is not limited thereto but may be otherwise embodied or practiced within the scope of the following claims.

I claim:

1. The method of cleansing filter cloths soiled with albuminous and alkaline earth deposits, which comprises soaking them in an aqueous solution of a molecularly dehydrated phosphate and thereafter in an aqueous nitrous acid solution.

2. The method of cleansing filter cloths soiled with albuminous and alkaline earth deposits, which comprises soaking them in an aqueous solution of a mixture of an alkali-metal molecularly dehydrated phosphate and an alkali-metal orthophosphate, and thereafter in an aqueous nitrous acid solution.

3. The method of cleansing filter cloths soiled with albuminous and alkaline earth deposits, which comprises soaking them in an aqueous metaphosphate solution and thereafter in an aqueous nitrous acid solution.

ANTON VOLZ.